(12) United States Patent
Meyer-Graefe et al.

(10) Patent No.: US 8,082,049 B2
(45) Date of Patent: Dec. 20, 2011

(54) METHOD AND APPARATUS FOR SAFE SWITCHING OF AN AUTOMATION BUS SYSTEM

(75) Inventors: Karsten Meyer-Graefe, Hoevelhof (DE); Johannes Kalhoff, Blomberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 862 days.

(21) Appl. No.: 11/187,746

(22) Filed: Jul. 22, 2005

(65) Prior Publication Data

US 2006/0029091 A1 Feb. 9, 2006

(30) Foreign Application Priority Data

Jul. 22, 2004 (DE) .......................... 10 2004 035 442

(51) Int. Cl.
*G05B 9/02* (2006.01)
*G05B 19/18* (2006.01)
*G05B 11/01* (2006.01)

(52) U.S. Cl. ................. 700/82; 700/3; 700/9; 700/21
(58) Field of Classification Search .................. 700/2–4, 700/9, 10, 19–21, 82, 275–276, 286; 714/11–13; 702/182–185
See application file for complete search history.

(56) References Cited

U.S. PATENT DOCUMENTS

| 6,021,356 | A | 2/2000 | Chang ................................. 700/3 |
| 6,061,809 | A * | 5/2000 | Glaser et al. .................... 714/11 |
| 6,449,544 | B1 | 9/2002 | Nitschke et al. |
| 6,591,150 | B1 * | 7/2003 | Shirota ............................. 700/82 |
| 6,826,433 | B1 * | 11/2004 | Barthel et al. .................. 700/79 |

FOREIGN PATENT DOCUMENTS

| CN | 87101838 | 12/1987 |
| DE | 3522220 | 1/1987 |
| DE | 4225834 | 2/1994 |
| DE | 19840562 | 3/2002 |
| JP | 10154991 | 6/1998 |
| JP | 2002509830 | 4/2002 |

OTHER PUBLICATIONS

Office Action dated Dec. 19, 2008 for the corresponding Chinese Patent Application No. 20050106722.6.
European Search Report dated Mar. 14, 2008 for the corresponding European Patent Application No. 05015856.7.
Office Action dated Jul. 3, 2009 corresponding to Japanese Patent Application No. 2005-212287.
Tobe, K., "InterBus," Automation, Nikkan Kogyo-Shimbun, vol. 43, No. 11, pp. 39-43, Nov. 1998.
Office Action dated Jan. 26, 2011 corresponding to Chinese Patent Application No. 200510106722.6.

* cited by examiner

*Primary Examiner* — Sean Shechtman
(74) *Attorney, Agent, or Firm* — Ohlandt, Greeley, Ruggiero & Perle, LLP

(57) ABSTRACT

The invention provides a method for operation of an automation system having at least one bus system connected to at least one subscriber, and having a central control system. The method includes parameterizing and/or programming the at least one bus subscriber by the central control device, identifying an interruption in the connection to the control device by the at least one bus subscriber, and controlling at least one output of the at least one bus subscriber as a function of the parameterizing and/or the programming upon identification of the interruption in the connection. The invention also provides an automation system which is suitable for carrying out the method.

6 Claims, 6 Drawing Sheets

METHOD AND APPARATUS FOR SAFE SWITCHING OF AN AUTOMATION BUS SYSTEM

CROSS-REFERENCE TO RELATED APPLICATION

The present application is claiming priority in German Patent Application No. 10 2004 035 442.1-31, filed on Jul. 22, 2004, the content of which is herein incorporated by reference.

BACKGROUND OF THE INVENTION

1. Field of the Invention

The invention relates in general to industrial automation systems, and in particular to automation systems which comprise at least one bus system with bus subscribers connected to it and a central control device, and to a method for its operation.

2. Description of the Related Art

Control and Data Transmission Systems nowadays assume a leading position in industrial manufacture and system control owing to the high degree of automation that they make possible. The use of field bus systems is very widespread, via which a large number of decentralized input and output units are connected to a central control device.

However, there is an increasing desire and requirement to change the configuration of the bus system during a running process by connecting or disconnecting decentralized units, for example in order to make it possible to carry out a tool change on robots or to allow mobile units, which are planned to be connected to the bus only at times, to be included in the bus system and to be removed again or else to make it possible to carry out disconnection operations for only a limited time in a simple manner for maintenance purposes. Furthermore, interference, for example as a result of electromagnetic radiation, may be a reason for configuration changes to the bus system.

From networks such as the Ethernet, it is known that these networks continue processing in the event of changes to the configuration of connected appliances and ignore the subscriber that has been disconnected or has failed.

In order to comply with safety standards, field bus systems are, however, predominantly used in conjunction with safety-compliant bus components in automation engineering. In the case of INTERBUS systems, by way of example, it is possible to disconnect assemblies from the bus by means of appropriate switching commands for configuration changes. In this situation, as in the case of interference as well, the field bus system is reinitialized. This results in a brief interruption in data communication when configuration changes are made in these systems.

When the communication to a bus component is interrupted, it can thus maintain an emergency functionality provided that no hazardous process is controlled by this bus component. If hazardous processes are being controlled, safety can generally be ensured only by shutting down the machine that is being controlled. For this purpose, safety-compliant bus components frequently have an internal watchdog circuit arrangement, which is reset only after receiving appropriate information. If this information is not received, the process is automatically switched to a safe state.

Frequent configuration changes, particularly in the case of systems which also have safety-compliant bus components, accordingly reduce their availability.

The invention is based on the object of increasing the availability of automation systems. It would be advantageous to carry this out while complying with safety requirements, such that the bus system may have both safety-compliant bus subscribers and non-safety-compliant bus subscribers.

SUMMARY OF THE INVENTION

The object is achieved in a surprisingly simple manner by subject matter as claimed in the attached claims. Advantageous embodiments and developments are described in the dependent claims.

The method according to the invention is used for operation of an automation system which has at least one bus system with bus subscribers connected to it, and has a central control device.

At least one bus subscriber is parameterized or configured and/or programmed by the control device. The bus subscriber can identify an interruption to the control device and, in this situation, can control at least one output on the basis of the default parameterization or configuration and/or programming.

This method, in particular the parameterization and/or programming of the bus subscriber, makes it possible to maintain the control even of hazardous processes for brief interruptions in data communication, such as those which occur during bus system switching processes.

An interruption in the connection to the control device is advantageously identified by the bus subscriber by not receiving any signal from the control device during a time period which can be defined.

Since self-sufficient or autonomous control by the bus subscriber is generally not suitable for continuous operation, the method provides a second time period which can be defined, after the elapse of the second time period the at least one output of the bus subscriber, via which the process is controlled, is switched to a safe state, if the connection to the control device is not restored within this second time period.

In order to increase the availability of the automation system, this second time period is advantageously longer than the time period which is required to carry out a switching process in the bus system.

The at least one bus subscriber can advantageously switch at least one assembly on or off. This assembly may, for example, be an actuator which is switched on in order to ensure safety, such as a door interlock. However, it may also be a hazardous actuator which is switched off in order to ensure safety, such as a robot arm or a cutting apparatus.

In order to make it possible for the at least one bus subscriber to continue with the process in specific applications, the invention also provides for the bus subscriber to advantageously have at least one input, in which case the signals at this input are evaluated by the bus subscriber and are used as further parameters for control via the at least one output of the bus subscriber.

It is also within the scope of the invention to specify an automation system which is suitable for carrying out the described method and accordingly has at least one bus system with bus subscribers connected to it and at least one control device connected to the bus system, as well as at least one bus subscriber which can be parameterized and/or programmed by the control device and has means for identification of an interruption in the connection to the control device, and means for controlling at least one output.

In order to identify that a time period which can be defined has passed, the at least one bus subscriber advantageously comprises means for monitoring the time.

Furthermore, the at least one bus subscriber preferably comprises means for switching at least one assembly on or off, in order to make it possible to activate and/or to deactivate actuators in the system being controlled.

If sensors have to be read by the at least one bus subscriber in order to control the process, then the bus subscriber preferably comprises at least one input as well as means for evaluation of the signals which are applied to this input.

Automation systems with ring bus systems, in particular based on the INTERBUS standard, are particularly suitable for carrying out the method according to the invention.

The invention will be described in more detail in the following text using, by way of example, preferred embodiments and with reference to the attached drawings. In this case, identical reference symbols in the drawings denote identical or similar parts.

DESCRIPTION OF THE INVENTION

The method according to the invention is particularly suitable for all ring bus systems, in which the exemplary embodiments which are described in the following text using the INTERBUS standard.

Figure 1:
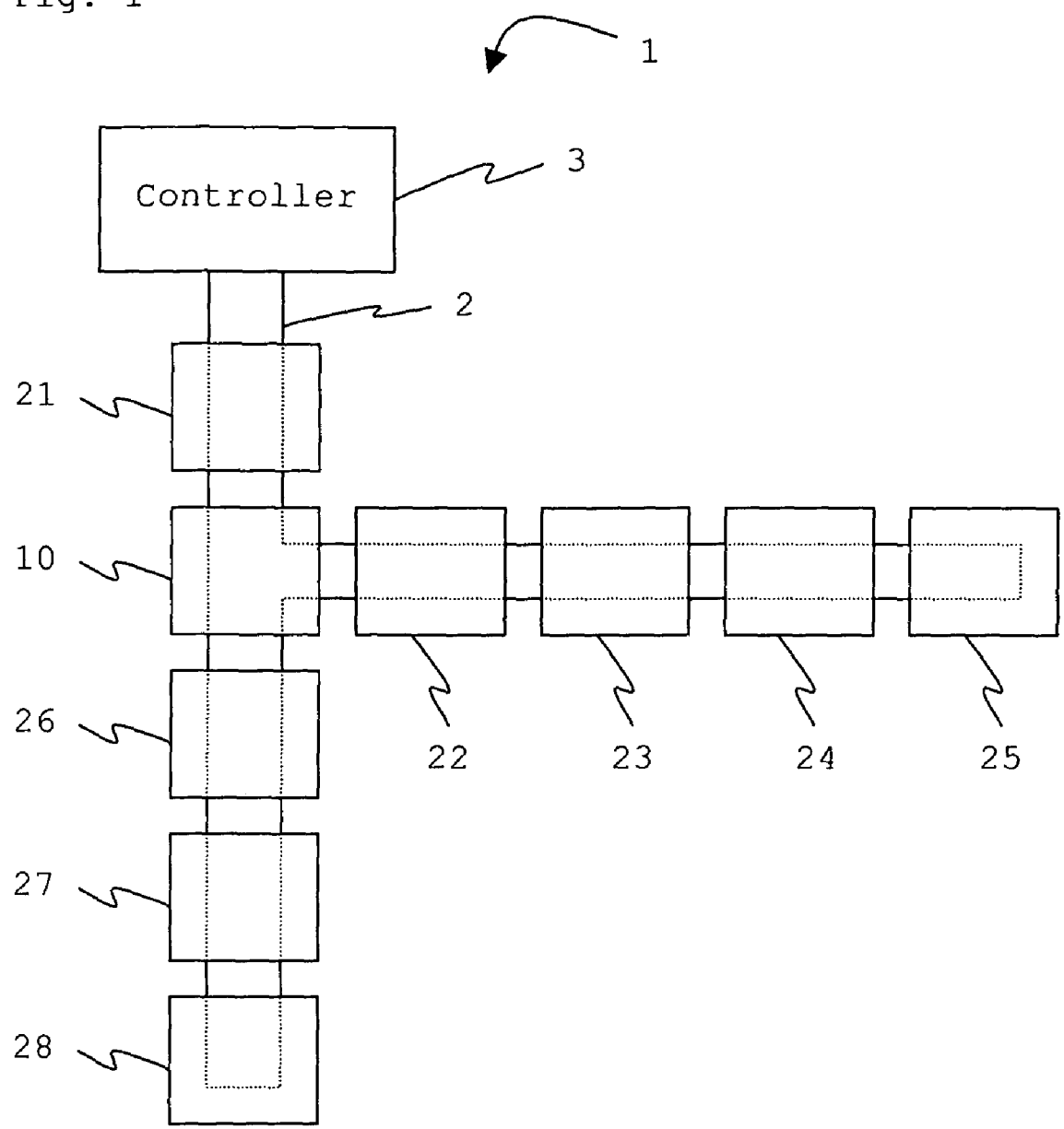
FIG. 1 shows a schematic illustration of a bus system with bus subscribers connected and a central control device.

The schematic layout of an automation system 1 with a bus system 2 based on the INTERBUS standard is illustrated in FIG. 1.

Topologically, INTERBUS is a ring system, that is to say all of the bus subscribers 21 to 28 are actively included in a closed transmission path. Each bus subscriber 21 to 28 regenerates the incoming signal, and passes it on. As a special feature in comparison to other ring systems, both the data forward line and the data return line in the INTERBUS system are passed through all the bus subscribers within one cable. This results in the physical appearance of a line or tree structure. A main trunk originates from the control device 3, which acts as the bus master, from said main trunk a subsystem for structuring the overall system is formed by means of a bus coupler 10.

The data are not assigned to the individual bus subscribers, as it is necessary in other systems, by the allocation of a bus address, but automatically by means of the physical position of the bus subscribers 21 to 28 in the system. INTERBUS operates on the basis of the sum frame method with only one protocol frame for the messages for all of the bus subscribers 21 to 28. The data for all the connected bus subscribers are included, combined to form a block, in the sum frame. In practice, this method may be regarded as a register, which is formed by the bus subscribers 21 to 28 that are connected to form a ring system.

In the event of changes to the configuration of the bus system, all of the bus subscribers are identified again, and the sum frame is redefined, by carrying out identification cycles.

Figure 2:
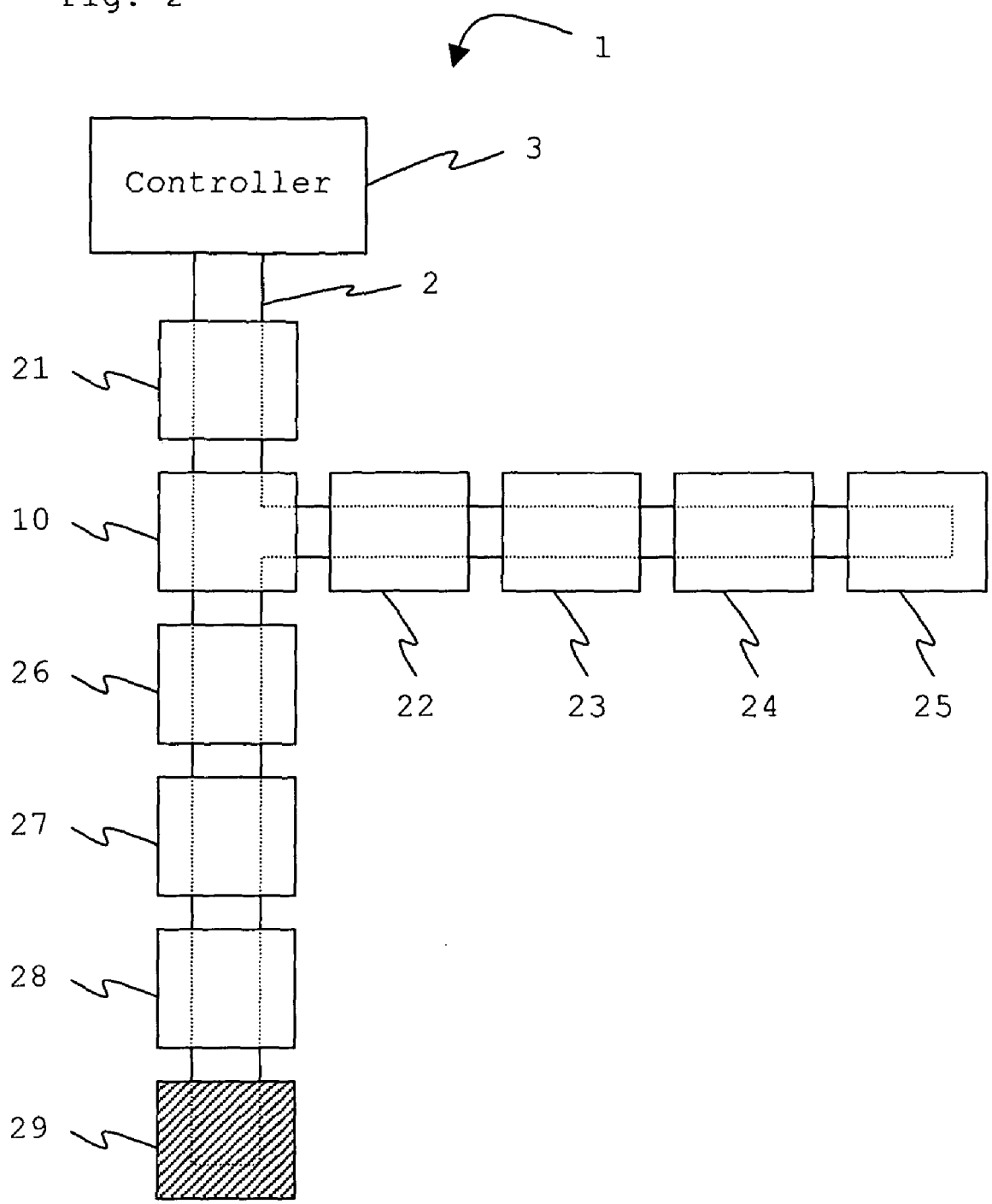
FIG. 2 shows the bus system as in FIG. 1 with an additionally connected bus subscriber.

As illustrated in FIG. 2, configuration changes may occur, for example, as a result of the connection of a further bus subscriber 29 to the bus system 2.

Figure 3:
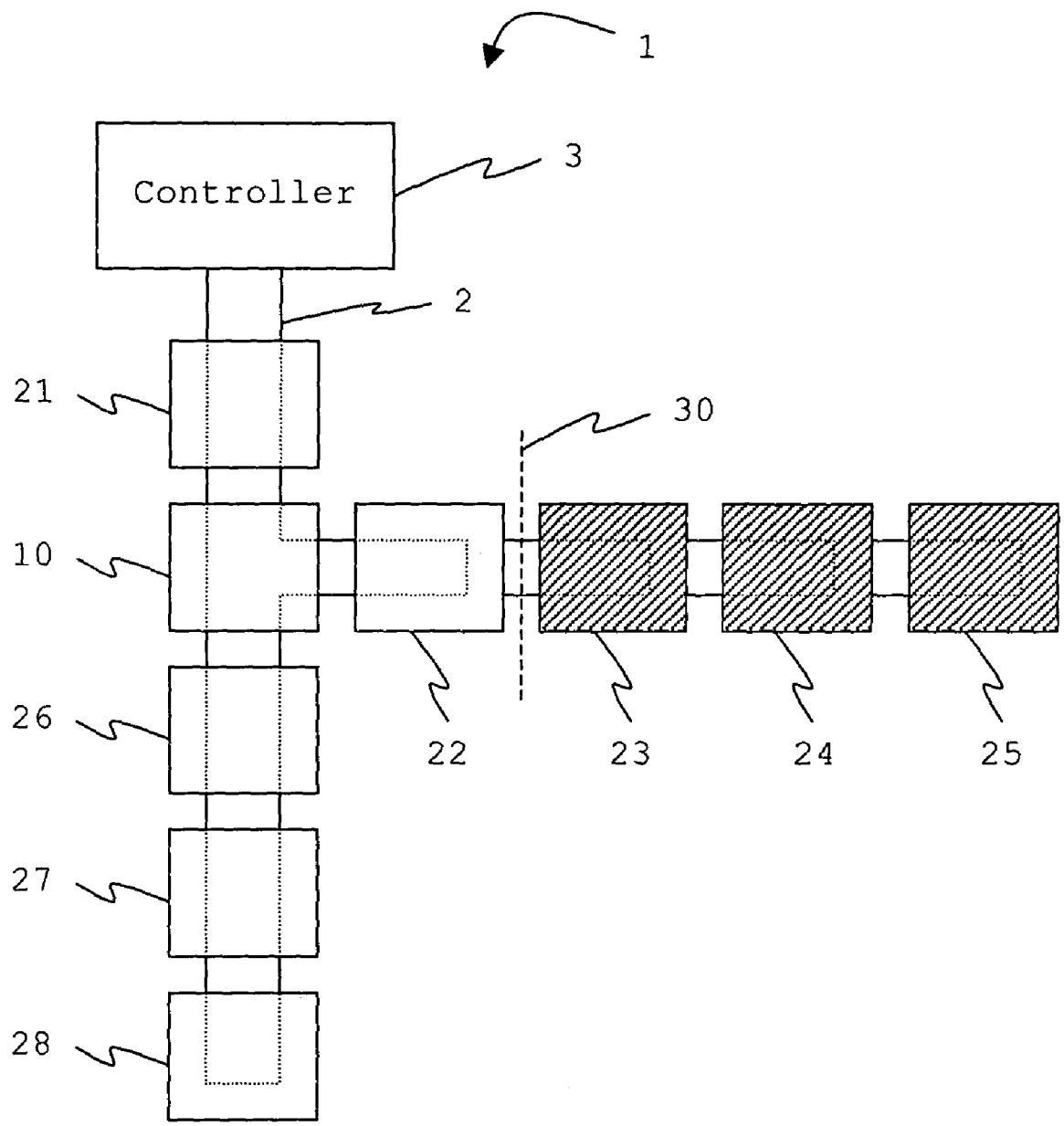
FIG. 3 shows the bus system as in FIG. 1, in which two or more bus subscribers have been removed from the bus system as a result of interference or a defect.

A further example of possible changes to the configuration of the bus system 2 is illustrated in FIG. 3. If the control device identifies a disturbance 30 in data transmission, identification cycles are carried out, with one further bus subscriber in each case being added to the bus system 2. This allows the disturbance 30 to be located and, as in this example, allows continued operation of the bus system with the bus subscribers 23 to 25 being excluded.

Figure 4:
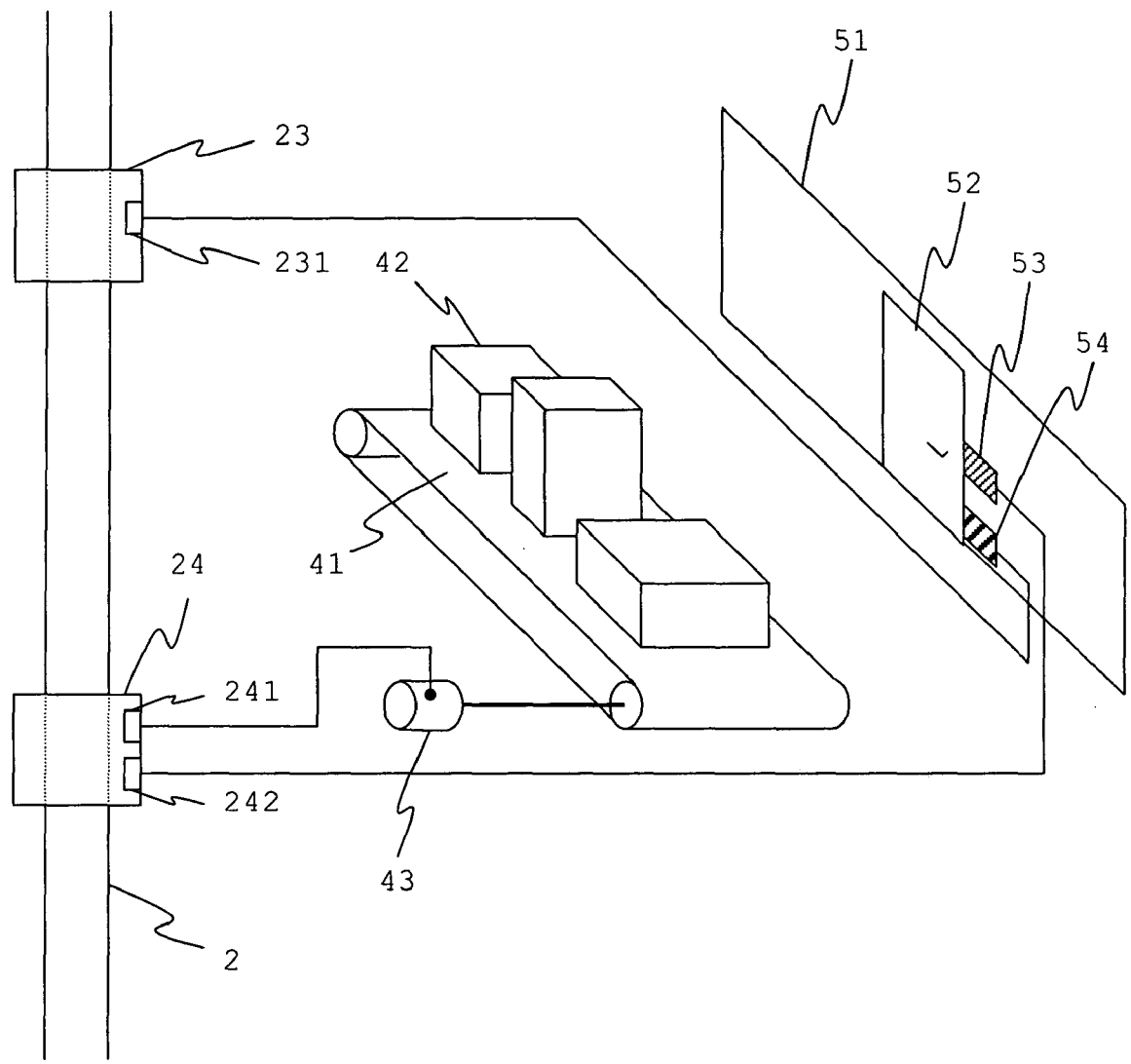
FIG. 4 shows a schematic illustration of one exemplary embodiment, in which a hazardous process is being controlled.

FIG. 4 shows a part of an automation system according to the invention. The drive 43 for a conveyor belt 41, on which conveyed goods 42 are transported, is controlled via an output 241 of a bus subscriber 24. This hazardous process is shielded by a guard 51. Access is possible only via a guard door 52. During normal operation, a sensor 54 which responds to the opening of the guard door 52 is read via the input 231 of the bus subscriber 23, which is connected to the bus system 2.

If the guard door is opened, the control device 3 (which is not illustrated here) transmits a control command to the bus subscriber 24 to shut down the drive 43 of the conveyor belt 41 via the input 241. This ensures safety when any one enters the hazardous area. The bus subscribers 23 and 24 are in this case safety-compliant bus subscribers.

If the data communication between the control device 3 and the bus subscribers 23 and/or 24 is interrupted as a result of a switching process or a disturbance in the bus system 2, then normal operation is no longer possible. In this case, the bus subscriber 24 is switched to a quasi-safe state. The response of the bus subscriber 24 is in this case governed by previous programming or parameterization by the control device 3.

In this exemplary embodiment, the conveyor belt 41 can still be driven in the quasi-safe state. The safety is ensured by an interlock 53 on the guard door 52 being activated via the output 242 of the bus subscriber 24 in such a way that it is not possible to enter the hazardous area.

If the data communication between the control device 3 and the bus subscribers 23 and 24 is restored within a defined time period, then normal operation can be continued. This allows switching processes in the bus system to be bridged, thus increasing the availability of the overall system, while ensuring safety.

If the data communication is not restored within the defined time period, then the bus subscriber 24 is switched to a safe final state. In this exemplary embodiment, the drive 43 for the conveyor belt 41 is shut down via the output 241 in the safe final state, and the interlock 53 for the guard door 52 is deactivated again, in the safe final state.

Figure 5:
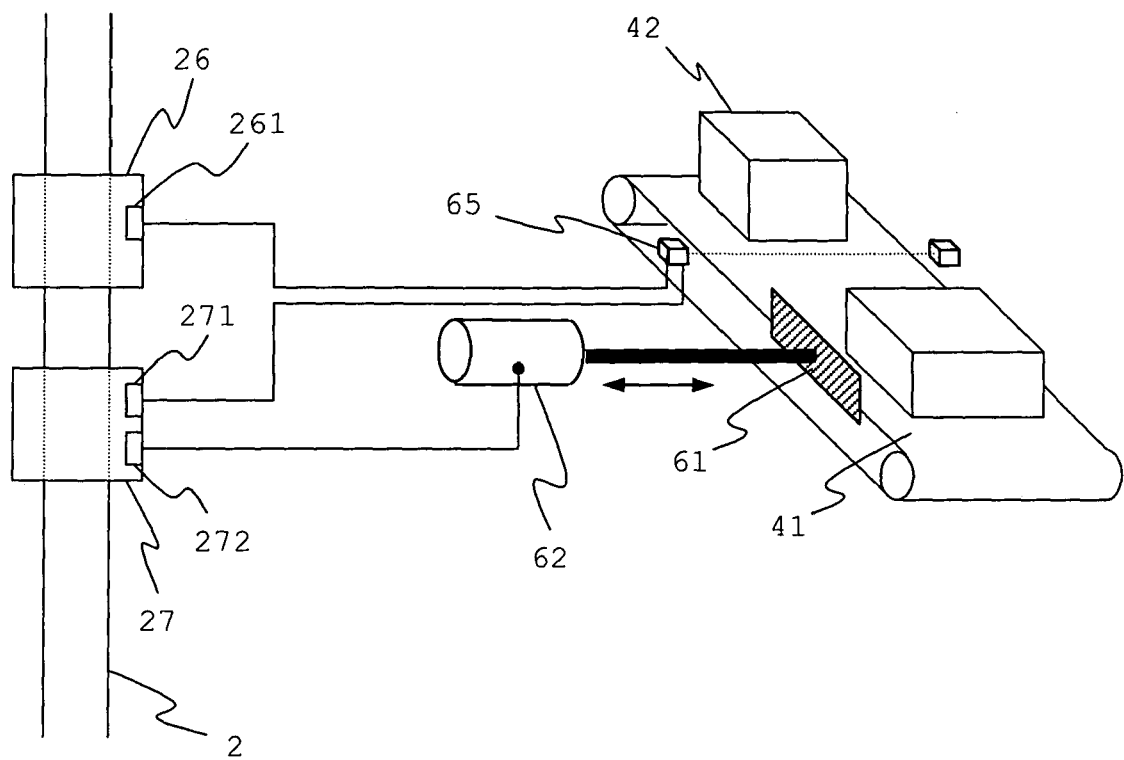
FIG. 5 shows a schematic illustration of one exemplary embodiment, in which a standard process is being controlled.

FIG. 5 shows a further exemplary embodiment, in which a process which is not classified as being hazardous is being controlled. During normal operation, a sensor 65 which identifies a conveyed item 42 that is being transported on the conveyor belt 41 is read via the input 261 of the bus subscriber 26. The drive 62 of a slide 61 is controlled via an output 272 of the bus subscriber 27.

When the data communication via the bus system 2 is interrupted in this exemplary embodiment, the bus subscriber 27 switches to a transitional state. In this state, the slide can still be controlled since the bus subscriber 27 has a dedicated input 271 via which the signals from the sensor 65 are read. In this exemplary embodiment as well, the programming and/or parameterization of the bus subscriber 27 can provide for the transitional state to be maintained only for a maximum time period which can be defined. If the bus subscriber 27 is still not receiving any signals from the control device 3 once this time period has elapsed, then the bus subscriber 27 switches to a final state in which, for example, the slide 61 is moved to a rest position, and the drive 62 for the slide 61 is shut down.

Figure 6:
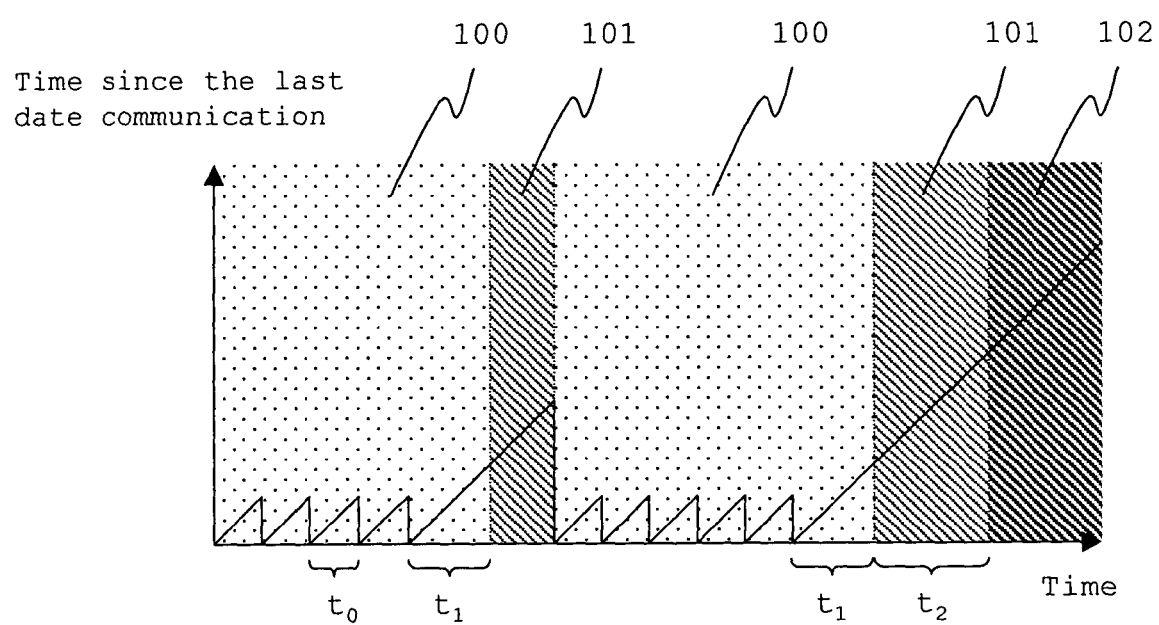
FIG. 6 shows a timing diagram in order to illustrate the states of a bus subscriber.

The method according to the invention is illustrated once again, in the form of a timing diagram, in FIG. 6. The illustration shows the time since the respective last data communication between a control device 3 and an appropriately programmed or configured safety-compliant bus subscriber 24.

During normal operation 100, data communication takes place at regular time intervals $t_0$. If no data communication is recorded for a time period $t_1$, which can be defined, then the connection is assumed to be interrupted, and the bus subscriber 24 is switched to a quasi-safe state 101. This quasi-safe state 101 is maintained for a time period $t_2$ which can be defined.

If data communication takes place within the time period $t_2$, the bus subscriber is switched back to normal operation 100. Otherwise, once the time period $t_2$ has elapsed, the bus subscriber is switched to a safe final state 102.

A corresponding procedure is used for non-safety-compliant bus subscribers 27.

It should be understood that various alternatives, combinations and modifications of the teachings described herein could be devised by those skilled in the art. The present invention is intended to embrace all such alternatives, modifications and variances that fall within the scope of the appended claims.

The invention claimed is:

1. A method for operation of an automation system having at least one bus system connected to at least one bus subscriber and having a central control device connected to the bus system for controlling the at least one bus subscriber during normal operation, the method comprising:
   parameterizing and/or programming the at least one bus subscriber by the control device;
   identifying an interruption in a connection to the control device by the at least one bus subscriber;
   controlling at least one output of the at least one bus subscriber by the at least one bus subscriber as a function of the parameterizing and/or the programming upon identification of the interruption in the connection to the control device, the at least one bus subscriber having at least one input;
   evaluating the signals at the input by the at least one bus subscriber; and
   using the evaluated signals at the input for controlling the at least one output as a function of the parameterizing and/or the programming, the method further comprising the at least one bus subscriber identifying an interruption in the connection to the control device if said at least one bus subscriber does not receive any signal from the control device during a first definable time period,
   wherein said at least one bus subscriber switches to a transitional state upon identification of the interruption in the connection to the control device, wherein, in said transitional state, the at least on output of the at least one bus subscriber is governed by a previous parameterization and/or programming of the at least one bus subscriber by the control device,
   and wherein said at least one bus subscriber is switched to a safe final state if the connection to the control device is not restored within a second time period.

2. The method of claim 1, wherein the at least one bus subscriber switches at least one assembly of the automation system on or off.

3. An automation system for carrying out the method of claim 1, comprising:
   at least one bus system;
   at least one bus subscriber connected to the bus system and having at least one output; and
   at least one control device connected to the bus system for controlling the at least one bus subscriber during normal operation,
   wherein the at least one bus subscriber is parameterized and/or programmed by the control device and has means for identification of an interruption in the connection to the control device and means for controlling the at least one output as a function of the parameterizing and/or the programming upon identification of the interruption,
   wherein the at least one bus subscriber has at least one input and means for evaluation of signals which are applied to the input, and
   wherein the at least one bus subscriber is adapted to use the signals that are applied to the input and evaluated by the evaluating device for controlling the at least one output as a function of the parameterizing and/or the programming,
   said at least one bus subscriber having means for monitoring the time, wherein
   the at least one bus subscriber further identifies an interruption in the connection to the control device if said at least one bus subscriber does not receive any signal from the control device during a first definable time period, and
   switches to a transitional state upon identification of the interruption in the connection to the control device, wherein, in said transitional state, the at least one output of the bus subscriber is governed by a previous parameterization and/or programming of the bus subscriber by the control device,
   and switches to a safe final state if the connection to the control device is not restored within a second time period.

4. The automation system of claim 3, wherein the at least one bus subscriber has means for switching at least one assembly on or off.

5. The automation system of claim 3, wherein the bus system is a ring system.

6. An automation system comprising:
   at least one bus system;
   at least one bus subscriber connected to the bus system and having at least one output; and
   at least one control device connected to the bus system for controlling the at least one bus subscriber during normal operation, wherein the at least one bus subscriber is parameterized and/or programmed by the control device, and has an identification device that identifies an interruption in the connection to the control device and a subscriber controlling device for controlling the at least one output as a function of the parameterizing and/or the programming upon identification of the interruption in the connection to the control device,
   wherein the at least one bus subscriber has at least one input and an evaluating device for evaluation of the signals which are applied to the input during said interruption in the connection to the control device, and wherein the at least one bus subscriber can use uses the signals that are applied to the input and evaluated by the evaluating device for controlling the at least one output as a function of the parameterizing and/or the programming, wherein the at least one bus subscriber has means for monitoring the time, and wherein the at least one bus subscriber identifies an interruption in the connection to the control device if said at least one bus subscriber does not receive any signal from the control device during a first definable time period, and the at least one bus subscriber switches to a transitional state if the data upon identification of the interruption in the connection to the control device, wherein, in said transitional state, the at least one output of the at least one bus subscriber is governed by a previous parameterization and/or programming of the at least one bus subscriber by the control device, and the at least one bus subscriber can switch switches to a safe final state if the connection to the control device is not restored within a second time period.

* * * * *